US012560785B2

(12) United States Patent
Shi

(10) Patent No.: US 12,560,785 B2
(45) Date of Patent: Feb. 24, 2026

(54) OPTICAL SYSTEM

(71) Applicant: Changzhou AAC Raytech Optronics Co., Ltd., Changzhou (CN)

(72) Inventor: Xiuting Shi, Changzhou (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 341 days.

(21) Appl. No.: 18/324,135

(22) Filed: May 25, 2023

(65) Prior Publication Data

US 2024/0248286 A1 Jul. 25, 2024

(30) Foreign Application Priority Data

Jan. 20, 2023 (CN) .......................... 202310075232.2

(51) Int. Cl.
*G02B 13/18* (2006.01)
*G02B 17/08* (2006.01)

(52) U.S. Cl.
CPC ........... *G02B 13/18* (2013.01); *G02B 17/086* (2013.01)

(58) Field of Classification Search
CPC .............................. G02B 13/18; G02B 17/086
USPC ...................................................... 359/485.03
See application file for complete search history.

(56) References Cited

U.S. PATENT DOCUMENTS 11,803,062 B1 * 10/2023 Huang ..................... G02B 9/12
2019/0258028 A1 * 8/2019 Huang ................... H04N 23/55

FOREIGN PATENT DOCUMENTS

CN 110764266 A * 2/2020 ......... G02B 27/0172
CN 114675419 A * 6/2022 ......... G02B 27/0101

* cited by examiner

*Primary Examiner* — Stephone B Allen
*Assistant Examiner* — Leonidas Boutsikaris
(74) *Attorney, Agent, or Firm* — Wiersch Law Group

(57) ABSTRACT

An optical system is provided, including from a front side to a back side: an image plane provided with a circular polarizer attached to a back side of thereof for transmitting light; a third lens configured to move forward and backward along an optical axis to change a diopter of the optical system, a partial reflective element is provided on a front surface of the third lens; a second lens; a first lens including a composite film is provide at a front surface thereof, the composite film includes a polarization reflective film attached to the front surface of the first lens and a quarter wave plate attached to a front side of the polarization reflective film; and an aperture located at the back side of the optical system; a maximum visible diameter VD satisfies VD≥10.00 mm, a maximum effective radius of each lens SDmax satisfies SDmax≤22.25 mm.

20 Claims, 9 Drawing Sheets

Lateral color

540nm

470nm

630nm

Image height (Millimeter)

Micrometer

30

18    15    14

11

19

VD

SDmax

OPTICAL SYSTEM

TECHNICAL FIELD

The present disclosure relates to the field of near-eye display technologies and, in particular, to an optical system.

BACKGROUND

With the rapid development of the technology related to smart head wear device, electronic devices equipped with optical lenses are widely applied, and more requirements for optical lenses are raised. The optical lenses grow rapidly in the applications of virtual reality, augmented reality and mixed reality. From the perspective of user experience, there is an urgent need for optical systems with small volume and excellent imaging manners.

SUMMARY

In view of the above problems, the present disclosure provides an optical system which has good optical properties and satisfies the design requirements of small volume and light weight.

In order to solve the above technical problems, embodiments of the present disclosure provides an optical system, including from a front side to a back side: an image plane provided with a circular polarizer attached to a back side of the image plane for transmitting light; a third lens configured to move forward and backward along an optical axis of the optical system to change the diopter of the optical system, a partial reflective element is provided on a front surface of the third lens; a second lens; a first lens including a composite film provide at a front surface of the first lens, the composite film includes a polarization reflective film and a quarter wave plate, and the polarization reflective film is attached to a front surface of the first lens, and the quarter wave plate is attached to a front side of the polarization reflective film; and an aperture located at the back side of the optical system, a maximum visible diameter of the optical system is VD, a maximum effective radius of each lens in the optical system is SDmax, and a following condition is satisfied: VD≥10.00 mm, and SDmax≤22.25 mm.

As an improvement, a back surface of the first lens is an aspheric surface.

As an improvement, a front surface of the second lens, a back surface of the second lens, the front surface of the third lens and a back surface of the third lens are aspheric surfaces.

As an improvement, a field of view FOV of the optical system satisfies 95.00°≤FOV≤115.00°.

As an improvement, the optical system satisfies TTL≤18.60 mm, where TTL denotes a total optical length from a back surface of the first lens to an image plane of the optical system along the optical axis.

As an improvement, the partial reflective element is a semi-transparent and semi-reflective film, and has a transmittance of 50% and a reflectivity of 50%.

As an improvement, the polarization reflective film has a reflectivity greater than or equal to 95%.

As an improvement, an optical distortion of the optical system is defined as DIST, which satisfies DIST≤30.25% in a state of 0D diopter.

As an improvement, a lateral color of the optical system is smaller than or equal to 185.00 μm.

As an improvement, a total optical length from a back surface of the first lens to an image plane of the optical system along the optical axis is defined as TTL, and a focal length of the optical system is defined as F, a following condition is satisfied: TTL/F≤0.85.

As an improvement, the image plane is a display device with a size of 2.1 inch.

The present disclosure has following beneficial effects: by disposing the partial reflective element on the front surface of the third lens, and by disposing a composite film that includes a polarization reflective film and a quarter wave plate sequentially on the first lens, a folding structure of the three-lens optical path is achieved, and the half aperture of the lens is controlled, the volume of the optical system is reduced, the freedom of design is increased, higher performance can be obtained, thereby improving the imaging quality. The maximum visible diameter is greater than or equal to 10.00 mm, so that the user can obtain the best display effect without tedious adjustment while achieving small volume and high imaging performance. Meanwhile, the third lens can move forward and backward freely, so that different degrees of diopter (0D~8D) can be achieved by changing the position of the third lens, thereby fitting different degrees of myopia.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

In order to better illustrate the objectives, technical solutions and advantages of the present disclosure, the present disclosure will be described in further detail below with reference to the accompanying drawings and embodiments. It should be understood that the specific embodiments described herein are only used to explain the present disclosure but are not used to limit the present disclosure.

Embodiment 1

Figure 1:
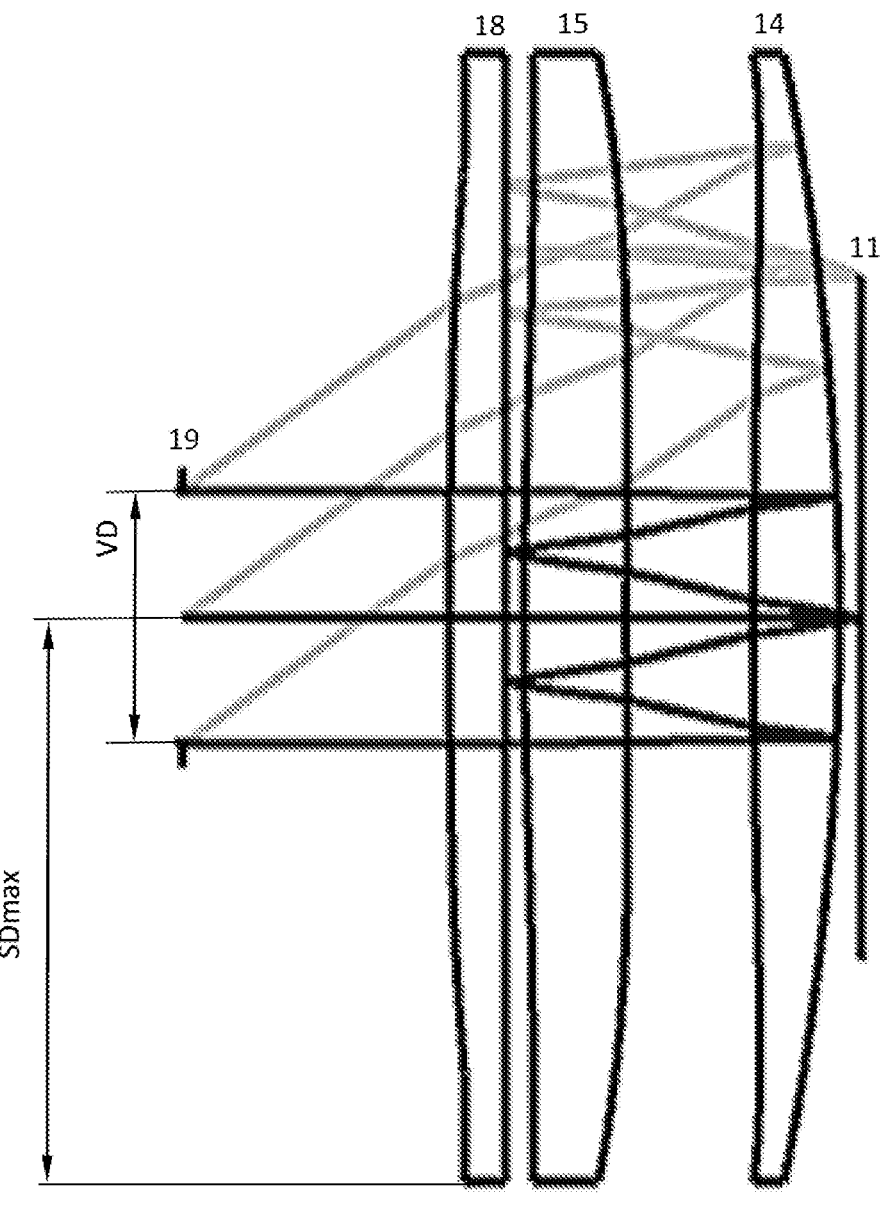
FIG. 1 is a structural schematic diagram of an optical system according to Embodiment 1 of the present disclosure.
Figure 5:
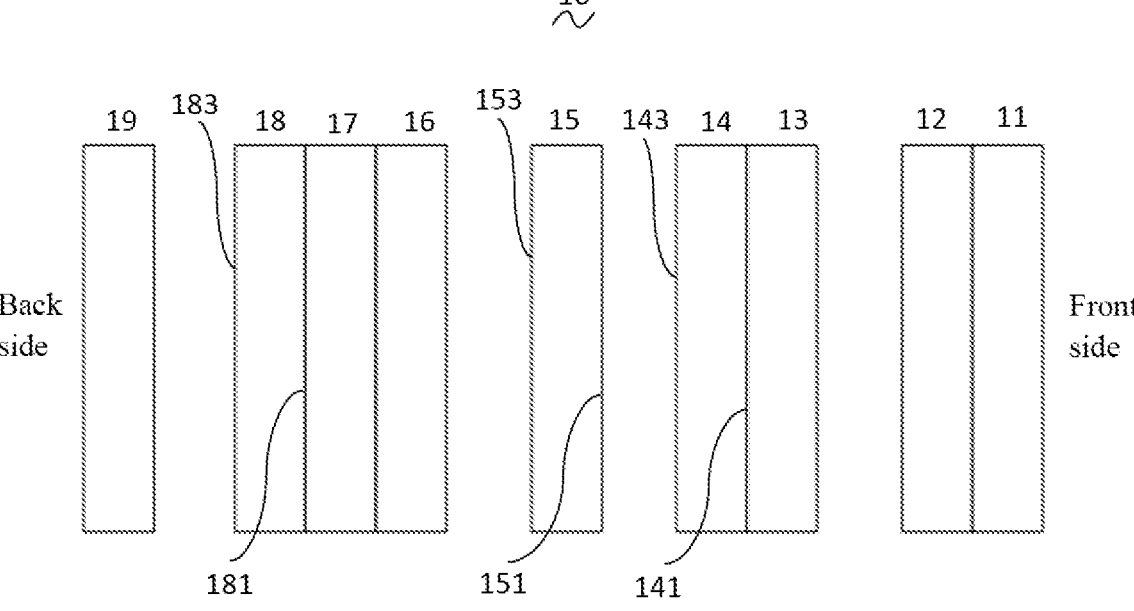
FIG. 5 is a schematic diagram of the optical system as shown in FIG. 1 including a film layer structure.

Refer to FIG. 1 and FIG. 5, an optical system is provided, including from a front side to a back side: an image plane 11, a circular polarizer 12, a partial reflective element 13, a third lens 14, a second lens 15, a quarter wave plate 16, a polarization reflective film 17, a first lens 18, and an aperture 19.

The image plane 11 emits light. The image plane 11 is provided with the circular polarizer 12 attached to the back side of the image plane 11. In this embodiment, the image plane 11 is a display device with a size of 2.1 inch. The light emitted by the display device passes through the circular polarizer 12 to form a left circularly polarized (LCP) light.

A third lens 14 can be moved forward and backward along the optical axis to change the diopter of the optical system 10. Moving forward and backward the third lens 14 on the optical axis can change the position of the third lens 14 on the optical axis, so that the optical system 10 can achieve different degrees of diopter to fit different degrees of myopia.

The partial reflective element 13 is disposed on the front surface 141 of the third lens 14, one portion of the light is reflected, and another portion of the light is incident on the third lens 14, and the light is the left circularly polarized light.

The left circularly polarized light incident on the third lens 14 is refracted by the third lens 14 and then incident on the second lens 15, and is refracted by the second lens 15 to incident on the first lens 18.

A composite film is disposed at a front surface 181 of the first lens 18. The composite film includes the polarization reflective film 17 and the quarter wave plate 16. The polarization reflective film 17 is attached to the front surface 181 of the first lens 18. The quarter wave plate 16 is attached to the front side of the polarization reflective film 17. The left circularly polarized light passes through the quarter wave plate 16 for the first time to be converted into a linearly polarized S light, and then is reflected to the quarter wave plate 16 at the polarization reflective film 17, the reflected light at this time is still a linearly polarized S light, and then passes through the quarter wave plate 16 to be converted into the left circularly polarized light, and then is incident to the second lens 15 for the second time, and then is incident to the quarter wave plate 16 after sequentially refracted by the second lens 15 and the third lens 14, and then is partially reflected at the partial reflecting element 13. The reflected light is converted into a right circularly polarized (RCP) light to be incident to the third lens 14 for the third time, and then is incident to the quarter wave plate 16 after refracted by the second lens 15 and the third lens 14 sequentially, and then passes through the quarter wave plate 16 to be converted into a linearly polarized P light, and then is incident to the polarization reflective film 17. Since the polarization reflective film 17 has properties of reflecting the linearly polarized S light and transmitting the linearly polarized P light, the linearly polarized P light is incident to the first lens 18, and then enters the aperture 19 after refracted by the first lens 18.

The position of the aperture 19 is the position of the simulated human eye surface, and the aperture 19 has a diameter of 10.00 mm. The maximum visible diameter of optical system 10 is defined as VD, which is 10 mm. VD≥10 mm is satisfied. That is, clear images can be seen when the human eye moves within a range of at least 10 mm in diameter, so that the user can see the best display effect in the best position without tedious adjustment, thereby increasing the FOV to more than 90°.

In this embodiment, the optical system 10 has a diopter of 0D. It should be noted that when light is incident from an object into another material with different optical density, propagation direction of the light will be deflected, and this phenomenon is called refraction, and the unit representing the magnitude of this refractive phenomenon (refractive power) is diopter (abbreviated as "D"). One diopter, or 1D, is equal to the so-called 100 degrees of myopia.

The first lens 18 has an effective radius of 22.25 mm, the second lens 15 has an effective radius of 22.25 mm and the third lens 14 has an effective radius of 22.25 mm. The maximum effective radius of each lens in the optical system 10 is defined as SDmax. SDmax≤22.25 mm is satisfied, which is beneficial to reducing the volume of the optical system.

In this embodiment, the back surface 183 of the first lens 18 is an aspheric surface, and setting at least one aspheric surface is beneficial to reducing the total optical length. In other optional embodiment, a free curved surface can also be used.

In this embodiment, the front surface 151 of the second lens 15, the back surface 153 of the second lens 15, the front surface 141 of the third lens 14, and the back surface 143 of the third lens 14 are all aspheric surfaces. Using aspheric surfaces is beneficial to correcting the aberration of the optical system. In other optional embodiment, a free curved surface can also be used.

In this embodiment, the front surface 181 of the first lens 18 is a flat surface, and the back surface 183 of the first lens 18 is a convex surface. The front surface 151 of the second lens 15 is a concave surface, and the back surface 153 of the second lens 15 is a convex surface. The front surface 141 of the third lens 14 is a convex surface, and the back surface 143 of the third lens 14 is a convex surface.

In this embodiment, a field of view of the optical system 10 is defined as FOV, and FOV is 96.65°. The FOV satisfies 95.00°≤FOV≤115.00°. A large field of view achieves better experience of the user.

A total optical length of the optical system (an on-axis distance from an image plane 11 to the back surface 183 of the first lens 18) is defined as TTL. In this embodiment, TTL is 18.534 mm, which satisfies TTL≤18.60 mm, so that it is beneficial to reducing the volume of the optical system.

In this embodiment, the partial reflective element is a semi-transparent and semi-reflective film with a transmittance of 50% and a reflectivity of 50%. In other optional embodiments, a ratio of reflection to transmission of the partial reflective elements can be adjusted according to specific design requirements, such as 55:45, 60:40, etc.

In this embodiment, a reflectivity of the polarization reflective film 17 is greater than or equal to 95%. A high reflectivity can improve the light efficiency of optical system 10 and increase the display brightness.

In this embodiment, the third lens 14 is located at a position of 0 D diopter on the optical axis. RMS radius≤30.00 μm can be achieved in this state. The smaller RMS radius (root mean square radius) is, the better the imaging quality of the system is.

An optical distortion of the optical system is defined as DIST, in this embodiment, the optical distortion DIST satisfies DIST≤30.25% in a state of 0 D diopter, so that the distortion is small, thereby providing more real VR environment to users.

In this embodiment, the lateral color of the optical system 10 is smaller than or equal to 185.00 μm.

A focal length of the optical system 10 is defined as f. In this embodiment, f is 25.343 mm and TTL/F is 0.731, which satisfies TTL/F≤0.85. It is beneficial to reducing the volume of the optical system. Optionally, TTL/f≤0.82 is satisfied.

In this embodiment, an anti-reflective film is disposed on each one of a back surface 183 of the first lens 18, a front surface 151 of the second lens 15, a back surface 153 of the second lens 15 and a back surface 143 of the third lens 14 to improve the light efficiency of the optical system 10, thereby improving brightness.

The optical system 10 of the present disclosure will be described below with examples. The symbols recorded in each example will be described as follows. The focal length, on-axis distance, central curvature radius, on-axis thickness, inflection point position, and arrest point position are each in unit of millimeter (mm).

Design data of the optical system 10 according to Embodiment 1 of the present disclosure are shown in Tables 1 and 2.

TABLE 1

|  | R |  | d | nd |  | vd |  |
|---|---|---|---|---|---|---|---|
| IMAGE | ∞ |  | ∞ |  |  |  |  |
| Aperture | ∞ | d0 = | 12.000 |  |  |  |  |
| R1 | 332.665 | d1 = | 2.560 | nd1 | 1.5444 | v1 | 56.28 |
| R2 | ∞ | d2 = | 0.802 |  |  |  |  |
| R3 | 156.996 | d3 = | 4.603 | nd2 | 1.5444 | v2 | 56.28 |
| R4 | 325.623 | d4 = | 5.712 |  |  |  |  |
| R5 | 255.194 | d5 = | 3.871 | nd3 | 1.5444 | v3 | 56.28 |
| R6 | −98.656 | d6 = | −3.871 |  |  |  |  |
| R5 | 255.194 | d7 = | −5.712 |  |  |  |  |
| R4 | 325.623 | d8 = | −4.603 | nd2 | 1.5444 | v2 | 56.28 |
| R3 | 156.996 | d9 = | −0.802 |  |  |  |  |
| R2 | ∞ | d2 = | 0.802 |  |  |  |  |
| R3 | 156.996 | d3 = | 4.603 | nd2 | 1.5444 | v2 | 56.28 |
| R4 | 325.623 | d4 = | 5.712 |  |  |  |  |
| R5 | 255.194 | d5 = | 3.871 | nd3 | 1.5444 | v3 | 56.28 |
| R6 | −98.656 | d10 = | 0.986 |  |  |  |  |
| Image plane | ∞ |  |  |  |  |  |  |

The reference signs are explained as follows

R: central curvature radius of an optical surface;

R1: central curvature radius of the back surface of the first lens 18;

R2: central curvature radius of the front surface of the first lens 18;

R3: central curvature radius of the back surface of the second lens 15;

R4: central curvature radius of the front surface of the second lens 15;

R5: central curvature radius of the back surface of the third lens 14;

R6: central curvature radius of the front surface of the third lens 14;

d: on-axis thickness of a lens and an on-axis distance between lenses (for convenience of understanding an optical path, the propagation of light from the back side to the front side is set as positive, while the propagation of light from the front side to the back side is set as negative);

d0: on-axis distance from the aperture 19 to the back surface 183 of the first lens 18;

d1: on-axis thickness of the first lens 18;

d2: on-axis distance from the front surface 181 of the first lens 18 to the back surface 151 of the second lens 15;

d3: on-axis thickness of the second lens 15;

d4: on-axis distance from the front surface 153 of the second lens 15 to the back surface 143 of the third lens 14;

d5: on-axis thickness of the third lens 14;

d6: negative value of on-axis thickness of the third lens 14;

d7: negative value of on-axis distance from the front surface 153 of the second lens 15 to the back surface 143 of the third lens 14;

d8: negative value of on-axis thickness of the second lens 15;

d9: negative value of on-axis distance from the front surface 181 of the first lens 18 to the back surface 151 of the second lens 15;

d10: on-axis distance from the front surface 141 of the third lens 14 to the image plane 11;

nd: refractive index of a d-line (the d-line is green light with a wavelength of 540 nm);

nd1: refractive index of the d-line of the first lens 18;

nd2: refractive index of the d-line of the second lens 15;

nd3: refractive index of the d-line of the third lens 14;

vd: Abbe number;

v1: Abbe number of the first lens 18;

v2: Abbe number of the second lens 15;

v3: Abbe number of the third lens 14;

Table 2 shows aspheric surface data of each lens in the optical system 10 according to Embodiment 1 of the present disclosure.

TABLE 2

|  | Conic coefficient | Aspheric coefficient |  |  |  |  |
|---|---|---|---|---|---|---|
|  | k | A4 | A6 | A8 | A10 | A12 |
| R1 | 2.00363E+01 | −3.63624E−06 | 6.70601E−08 | −4.31754E−10 | 2.01629E−12 | −6.98540E−15 |
| R2 | 0.00000E+00 | 0.00000E+00 | 0.00000E+00 | 0.00000E+00 | 0.00000E+00 | 0.00000E+00 |
| R3 | 2.22187E+00 | −6.19080E−06 | −1.13863E−08 | 8.98572E−11 | −4.35230E−13 | 1.63725E−15 |
| R4 | −7.24330E+01 | −1.34171E−05 | 3.31200E−08 | −1.56250E−10 | 4.73742E−13 | −6.64306E−16 |
| R5 | −7.11965E+01 | −3.20162E−06 | 6.48450E−09 | −2.59306E−11 | 5.32606E−14 | −2.03468E−16 |
| R6 | −3.36005E+00 | 7.73953E−07 | −1.02637E−08 | 8.14260E−11 | −4.10214E−13 | 1.26611E−15 |

TABLE 2-continued

| | Conic coefficient | Aspheric coefficient | | | | |
|---|---|---|---|---|---|---|
| | k | A14 | A16 | A18 | A20 | A22 |
| R1 | 2.00363E+01 | 1.83706E−17 | −3.44400E−20 | 3.22603E−23 | −7.04406E−27 | 3.46748E−29 |
| R2 | 0.00000E+00 | 0.00000E+00 | 0.00000E+00 | 0.00000E+00 | 0.00000E+00 | 0.00000E+00 |
| R3 | 2.22187E+00 | −3.81693E−18 | 5.35135E−21 | −4.06856E−24 | 8.74553E−28 | 1.78518E−31 |
| R4 | −7.24330E+01 | 2.49582E−20 | 1.32939E−21 | −1.69466E−24 | 4.60879E−28 | −6.93601E−32 |
| R5 | −7.11965E+01 | 8.22742E−19 | −1.75606E−21 | 1.70486E−24 | −6.34885E−28 | −6.20176E−32 |
| R6 | −3.36005E+00 | −2.39813E−18 | 2.69610E−21 | −1.65442E−24 | 4.22126E−28 | −2.20328E−32 |

| | Conic coefficient | Aspheric coefficient | | | |
|---|---|---|---|---|---|
| | k | A24 | A26 | A28 | A30 |
| R1 | 2.00363E+01 | −6.30273E−32 | −3.16300E−35 | 2.11280E−38 | 6.61831E−41 |
| R2 | 0.00000E+00 | 0.00000E+00 | 0.00000E+00 | 0.00000E+00 | 0.00000E+00 |
| R3 | 2.22187E+00 | 4.27116E−34 | −2.06549E−37 | −2.05761E−40 | 6.36226E−43 |
| R4 | −7.24330E+01 | 2.24923E−35 | −1.65443E−38 | 1.86199E−40 | 1.04378E−42 |
| R5 | −7.11965E+01 | −9.37740E−35 | 5.68353E−38 | 2.04409E−40 | 2.26888E−43 |
| R6 | −3.36005E+00 | 2.29331E−35 | −4.29050E−38 | −7.72670E−42 | 1.22267E−43 |

For convenience, the aspheric surfaces of each lens use the aspheric surfaces shown in condition (1) below. However, the present disclosure is not limited to the polynomial form of aspheric surfaces represented by a condition (1).

$$z = (cr^2)/\left\{1 + \left[1 - (k+1)(c^2 r^2)\right]^{1/2}\right\} + A4r^4 + A6r^6 + \quad (1)$$
$$A8r^8 + A10r^{10} + A12r^{12} + A14r^{14} + A16r^{16} + A18r^{18} +$$
$$A20r^{20} + A22r^{22} + A24r^{24} + A26r^{26} + A28r^{28} + A30r^{30}$$

Here, k denotes a conic coefficient, and A4, A6, A8, A10, A12, A14, A16, A18, A20, A22, A24, A26, A28, and A30 each denote an aspheric coefficient, respectively, c denotes an curvature at a center of an optical surface, r denotes a vertical distance between a point on a curve of the aspheric surface and the optical axis, and Z denotes an aspheric depth (i.e., a vertical distance between a point of the aspheric surface from which a distance to the optical axis is r, and a tangent plane tangent to a vertex on an aspheric optical axis).

Figures 2, 3:
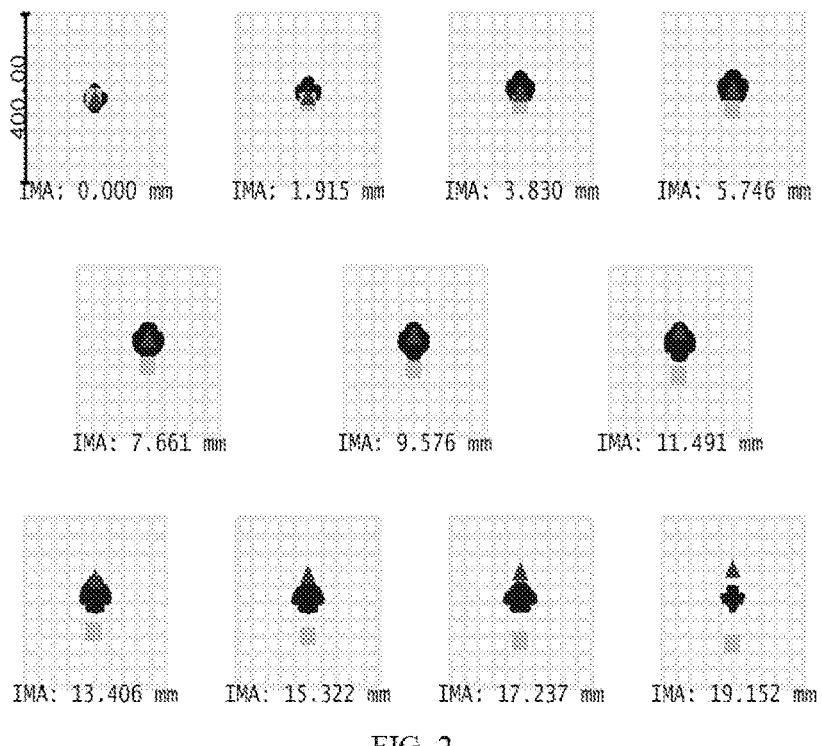
FIG. 2 is a spot diagram of the optical system shown in FIG. 1.
FIG. 3 is a schematic diagram of a lateral color of the optical system shown in FIG. 1.
Figure 4:
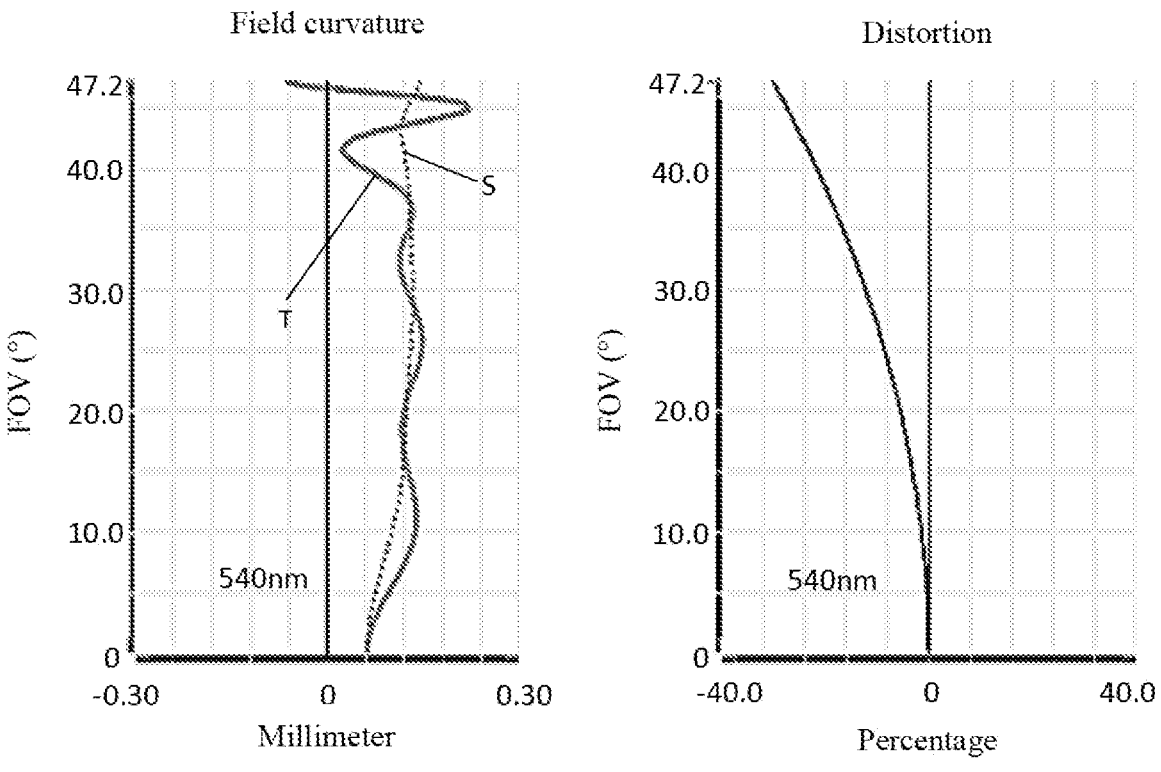
FIG. 4 is a schematic diagram of a field curvature and a distortion of the optical system as shown in FIG. 1.

FIG. 2 and FIG. 3 are a spot diagram and a lateral color schematic diagram of the optical system 10 after light having a wavelength of 470 nm, 540 nm and 630 nm passes through the optical system 10 according to Embodiment 1, respectively. FIG. 4 is a schematic diagram of a field curvature and a distortion of the optical system 10 after light having a wavelength of 540 nm passes through the optical system 10 according to Embodiment 1. A field curvature S in FIG. 4 is a field curvature in a sagittal direction, and T is a field curvature in a meridian direction.

In this embodiment, the optical system 10 has an entrance pupil diameter ENPD of 10.000 mm, a full-field image height IH of 19.152 mm, and a field of view FOV of 96.65° in a diagonal direction. The optical system 10 satisfies design requirements of small volume, and the maximum visible diameter greater than or equal to 10.00 mm, and has on-axis and off-axis chromatic aberrations fully corrected, thereby having excellent optical performance.

Embodiment 2

Figure 6:
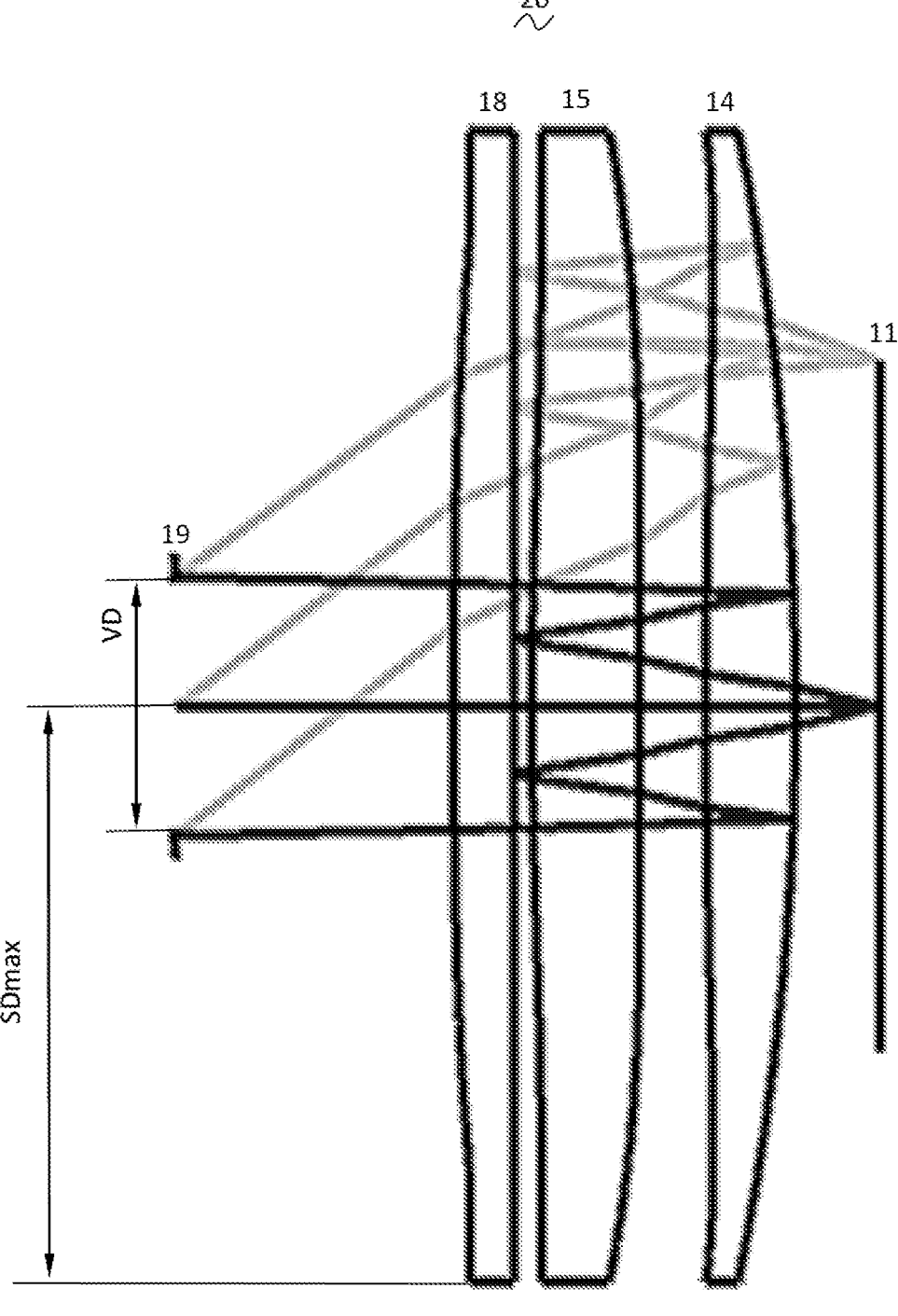
FIG. 6 is a partial structural schematic diagram of an optical system according to Embodiment 2 of the present disclosure.

FIG. 6 shows an optical system 20 of Embodiment 2 of the present disclosure. Embodiment 2 is basically the same as Embodiment 1, and involves symbols having the same meanings as Embodiment 1, and only differences therebetween are listed below.

In this embodiment, the third lens 14 is located at a position of 4D diopter on the optical axis. RMS radius≤30.00 μm can be achieved in this situation.

In this embodiment, optical distortion DIST of the optical system 20 in the situation of 4D diopter satisfies DIST≤36.62%, so that the distortion is small, thereby providing more real VR environment to users.

In this embodiment, a virtual image distance formed by the optical system 20 is 250 mm, which is suitable for people with 4D (i.e., myopia of 400 degrees) to watch images without wearing glasses.

Table 3 and Table 4 show the design data of the optical system 20 of the Embodiment 3 of the present disclosure.

TABLE 3

| | R | | d | nd | | vd |
|---|---|---|---|---|---|---|
| IMAGE | ∞ | | −250 | | | |
| Aperture | ∞ | d0 = | 12.000 | | | |
| R1 | 332.665 | d1 = | 2.560 | nd1 | 1.5444 v1 | 56.28 |
| R2 | ∞ | d2 = | 0.802 | | | |
| R3 | 156.996 | d3 = | 4.603 | nd2 | 1.5444 v2 | 56.28 |
| R4 | 325.623 | d4 = | 2.912 | | | |
| R5 | 255.194 | d5 = | 3.871 | nd3 | 1.5444 v3 | 56.28 |
| R6 | −98.656 | d6 = | −3.871 | | | |
| R5 | 255.194 | d7 = | −2.912 | | | |
| R4 | 325.623 | d8 = | −4.603 | nd2 | 1.5444 v2 | 56.28 |
| R3 | 156.996 | d9 = | −0.802 | | | |
| R2 | ∞ | d2 = | 0.802 | | | |
| R3 | 156.996 | d3 = | 4.603 | nd2 | 1.5444 v2 | 56.28 |
| R4 | 325.623 | d4 = | 2.912 | | | |
| R5 | 255.194 | d5 = | 3.871 | nd3 | 1.5444 v3 | 56.28 |
| R6 | −98.656 | d10 = | 3.639 | | | |
| Image plane | ∞ | | | | | |

Table 4 shows aspheric surface data of each lens in the optical system 20 according to Embodiment 2 of the present disclosure.

TABLE 4

| | Conic coefficient | Aspheric coefficient | | | | |
|---|---|---|---|---|---|---|
| | k | A4 | A6 | A8 | A10 | A12 |
| R1 | 2.00363E+01 | −3.63624E−06 | 6.70601E−08 | −4.31754E−10 | 2.01629E−12 | −6.98540E−15 |
| R2 | 0.00000E+00 | 0.00000E+00 | 0.00000E+00 | 0.00000E+00 | 0.00000E+00 | 0.00000E+00 |
| R3 | 2.22187E+00 | −6.19080E−06 | −1.13863E−08 | 8.98572E−11 | −4.35230E−13 | 1.63725E−15 |
| R4 | −7.24330E+01 | −1.34171E−05 | 3.31200E−08 | −1.56250E−10 | 4.73742E−13 | −6.64306E−16 |
| R5 | −7.11965E+01 | −3.20162E−06 | 6.48450E−09 | −2.59306E−11 | 5.32606E−14 | −2.03468E−16 |
| R6 | −3.36005E+00 | 7.73953E−07 | −1.02637E−08 | 8.14260E−11 | −4.10214E−13 | 1.26611E−15 |

| | Conic coefficient | Aspheric coefficient | | | | |
|---|---|---|---|---|---|---|
| | k | A14 | A16 | A18 | A20 | A22 |
| R1 | 2.00363E+01 | 1.83706E−17 | −3.44400E−20 | 3.22603E−23 | −7.04406E−27 | 3.46748E−29 |
| R2 | 0.00000E+00 | 0.00000E+00 | 0.00000E+00 | 0.00000E+00 | 0.00000E+00 | 0.00000E+00 |
| R3 | 2.22187E+00 | −3.81693E−18 | 5.35135E−21 | −4.06856E−24 | 8.74553E−28 | 1.78518E−31 |
| R4 | −7.24330E+01 | 2.49582E−20 | 1.32939E−21 | −1.69466E−24 | 4.60879E−28 | −6.93601E−32 |
| R5 | −7.11965E+01 | 8.22742E−19 | −1.75606E−21 | 1.70486E−24 | −6.34885E−28 | −6.20176E−32 |
| R6 | −3.36005E+00 | −2.39813E−18 | 2.69610E−21 | −1.65442E−24 | 4.22126E−28 | −2.20328E−32 |

| | Conic coefficient | Aspheric coefficient | | | |
|---|---|---|---|---|---|
| | k | A24 | A26 | A28 | A30 |
| R1 | 2.00363E+01 | −6.30273E−32 | −3.16300E−35 | 2.11280E−38 | 6.61831E−41 |
| R2 | 0.00000E+00 | 0.00000E+00 | 0.00000E+00 | 0.00000E+00 | 0.00000E+00 |
| R3 | 2.22187E+00 | 4.27116E−34 | −2.06549E−37 | −2.05761E−40 | 6.36226E−43 |
| R4 | −7.24330E+01 | 2.24923E−35 | −1.65443E−38 | 1.86199E−40 | 1.04378E−42 |
| R5 | −7.11965E+01 | −9.37740E−35 | 5.68353E−38 | 2.04409E−40 | 2.26888E−43 |
| R6 | −3.36005E+00 | 2.29331E−35 | −4.29050E−38 | −7.72670E−42 | 1.22267E−43 |

Figure 7:
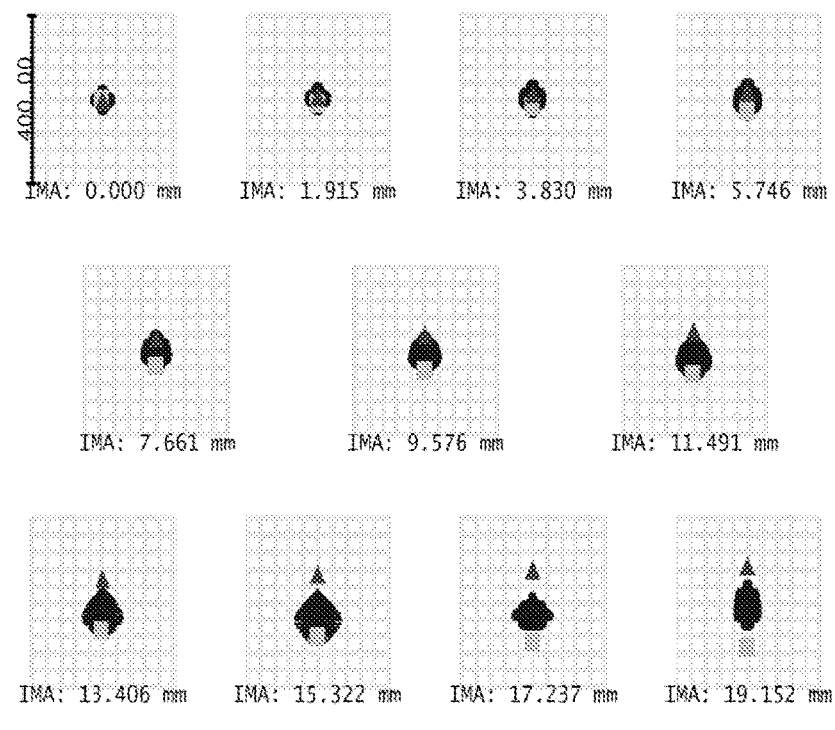
FIG. 7 is a spot diagram of the optical system shown in FIG. 6.
Figure 8:
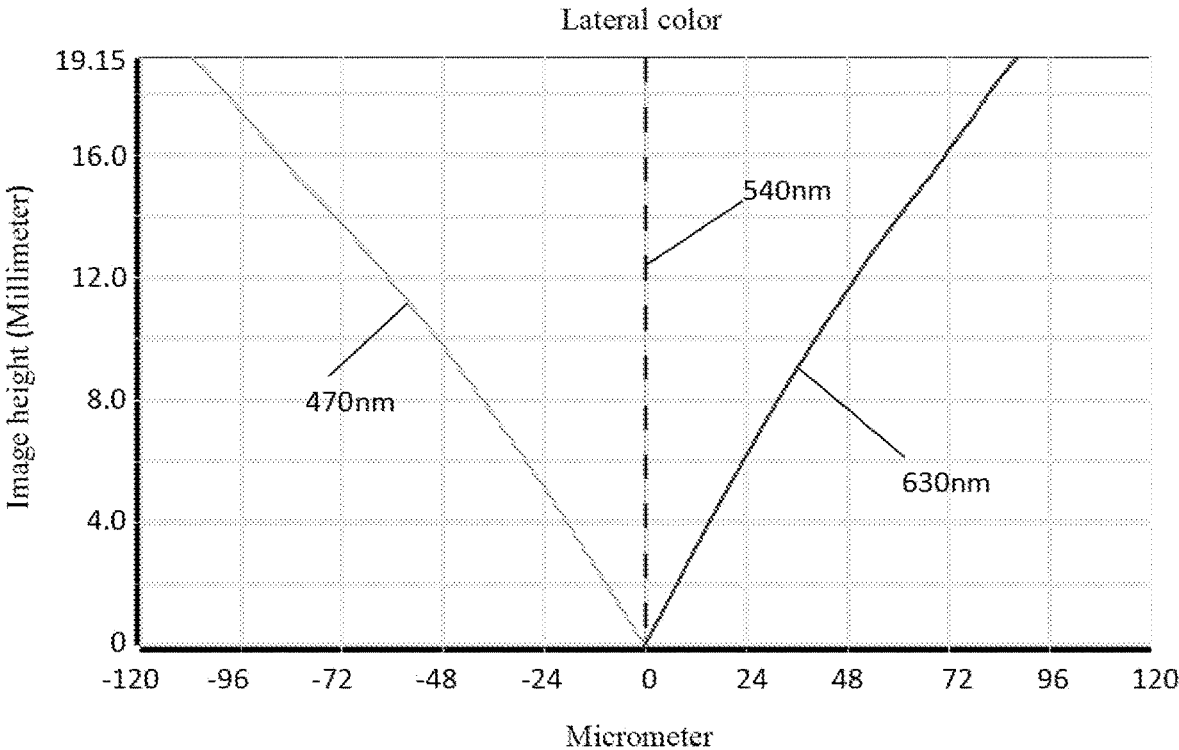
FIG. 8 is a schematic diagram of a lateral color of the optical system shown in FIG. 6.
Figure 9:
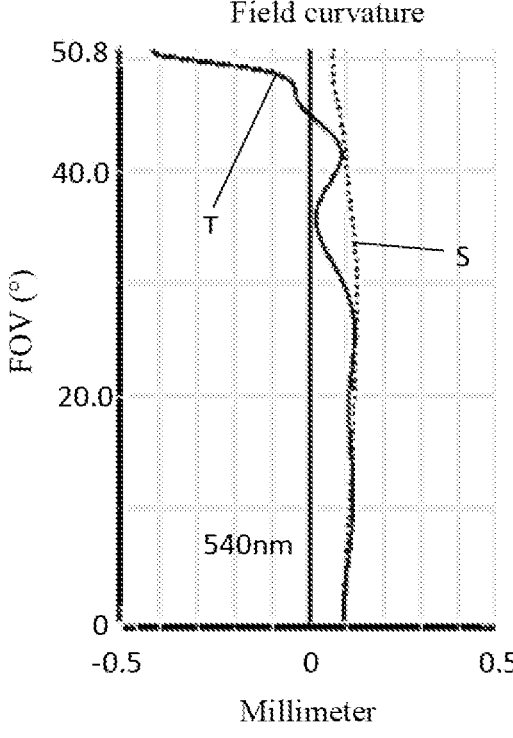
FIG. 9 is a schematic diagram of a field curvature and a distortion of the optical system as shown in FIG. 6.
Figure 9:
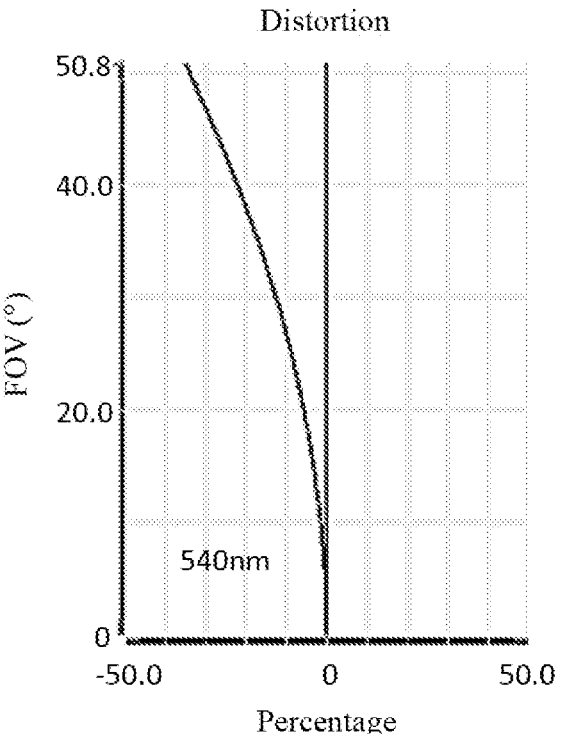
Figure 10:
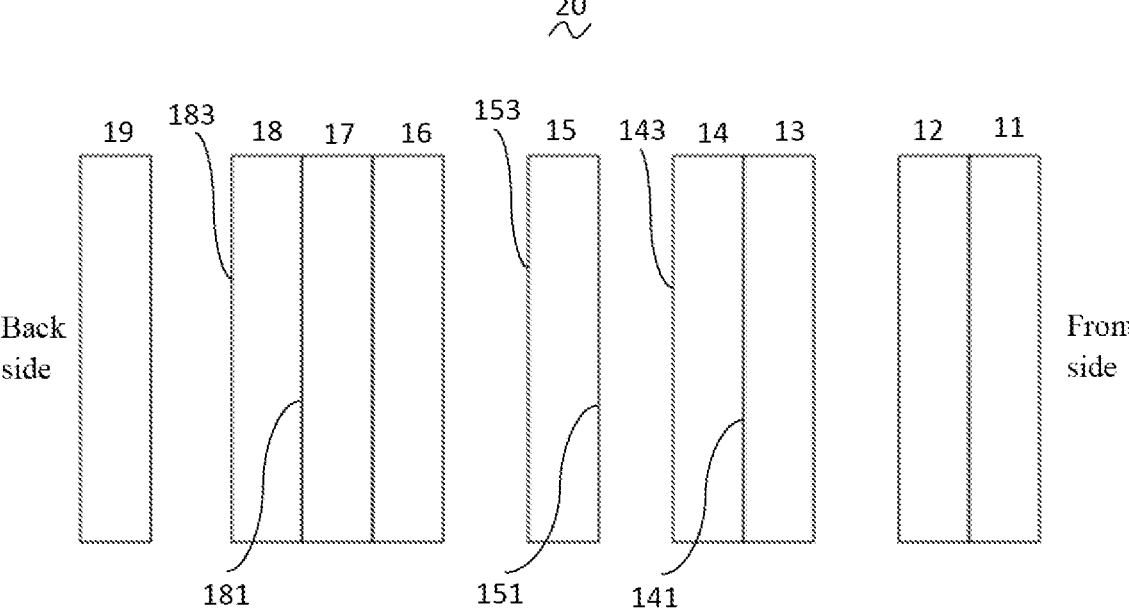
FIG. 10 is a schematic diagram of the optical system including a film layer structure as shown in FIG. 6.

FIG. 7 and FIG. 8 are a spot diagram and a lateral color schematic diagram of the optical system 10 after light having a wavelength of 470 nm, 540 nm and 630 nm passes through the optical system 20 according to Embodiment 2, respectively. FIG. 9 is a schematic diagram of a field curvature and a distortion of the optical system 20 after light having a wavelength of 540 nm passes through the optical system 20 according to Embodiment 2. A field curvature S in FIG. 9 is a field curvature in a sagittal direction, and T is a field curvature in a meridian direction.

In this embodiment, the optical system 20 has an entrance pupil diameter ENPD of 10.000 mm, TTL of 18.387 mm, a focal length f of 23.909 mm, TTL/f of 0.769, a full-field image height IH of 19.152 mm, and a field of view FOV of 103.75° in a diagonal direction. The optical system 20 satisfies design requirements of small volume, and the maximum visible diameter greater than or equal to 10.00 mm, and has on-axis and off-axis chromatic aberrations fully corrected, thereby having excellent optical performance.

Embodiment 3

Figure 11:
FIG. 11 is a partial structural schematic diagram of an optical system according to Embodiment 3 of the present disclosure.

FIG. 11 shows an optical system 30 of Embodiment 3 of the present disclosure. Embodiment 3 is basically the same as Embodiment 1, and involves symbols having the same meanings as Embodiment 1, and only differences therebetween are listed below.

In this embodiment, the third lens 14 is located at a position of 8D diopter on the optical axis. RMS radius≤80.00 μm can be achieved in this situation.

In this embodiment, optical distortion DIST of the optical system 30 in the situation of 8D diopter satisfies DIST≤42.37%, so that the distortion is small, thereby providing more real VR environment to users.

In this embodiment, a virtual image distance formed by the optical system 30 is 125 mm, which is suitable for people with 8D (i.e., myopia of 800 degrees) to watch images without wearing glasses.

Table 5 and Table 6 show the design data of the optical system 30 of the Embodiment 3 of the present disclosure.

TABLE 5

| | R | d | | nd | | vd |
|---|---|---|---|---|---|---|
| IMAGE | ∞ | −125 | | | | |
| Aperture | ∞ | d0 = | 12.000 | | | |
| R1 | 332.665 | d1 = | 2.560 | nd1 | 1.5444 v1 | 56.28 |
| R2 | ∞ | d2 = | 0.802 | | | |
| R3 | 156.996 | d3 = | 4.603 | nd2 | 1.5444 v2 | 56.28 |
| R4 | 325.623 | d4 = | 0.198 | | | |
| R5 | 255.194 | d5 = | 3.871 | nd3 | 1.5444 v3 | 56.28 |
| R6 | −98.656 | d6 = | −3.871 | | | |
| R5 | 255.194 | d7 = | −0.198 | | | |
| R4 | 325.623 | d8 = | −4.603 | nd2 | 1.5444 v2 | 56.28 |
| R3 | 156.996 | d9 = | −0.802 | | | |
| R2 | ∞ | d2 = | 0.802 | | | |
| R3 | 156.996 | d3 = | 4.603 | nd2 | 1.5444 v2 | 56.28 |
| R4 | 325.623 | d4 = | 0.198 | | | |
| R5 | 255.194 | d5 = | 3.871 | nd3 | 1.5444 v3 | 56.28 |
| R6 | −98.656 | d10 = | 6.375 | | | |
| Image plane | ∞ | | | | | |

Table 6 shows aspheric surface data of each lens in the optical system 30 according to Embodiment 3 of the present disclosure.

TABLE 6

| Conic coefficient | | Aspheric coefficient | | | | |
| --- | --- | --- | --- | --- | --- | --- |
| | k | A4 | A6 | A8 | A10 | A12 |
| R1 | 2.00363E+01 | −3.63624E−06 | 6.70601E−08 | −4.31754E−10 | 2.01629E−12 | −6.98540E−15 |
| R2 | 0.00000E+00 | 0.00000E+00 | 0.00000E+00 | 0.00000E+00 | 0.00000E+00 | 0.00000E+00 |
| R3 | 2.22187E+00 | −6.19080E−06 | −1.13863E−08 | 8.98572E−11 | −4.35230E−13 | 1.63725E−15 |
| R4 | −7.24330E+01 | −1.34171E−05 | 3.31200E−08 | −1.56250E−10 | 4.73742E−13 | −6.64306E−16 |
| R5 | −7.11965E+01 | −3.20162E−06 | 6.48450E−09 | −2.59306E−11 | 5.32606E−14 | −2.03468E−16 |
| R6 | −3.36005E+00 | 7.73953E−07 | −1.02637E−08 | 8.14260E−11 | −4.10214E−13 | 1.26611E−15 |

| Conic coefficient | | Aspheric coefficient | | | | |
| --- | --- | --- | --- | --- | --- | --- |
| | k | A14 | A16 | A18 | A20 | A22 |
| R1 | 2.00363E+01 | 1.83706E−17 | −3.44400E−20 | 3.22603E−23 | −7.04406E−27 | 3.46748E−29 |
| R2 | 0.00000E+00 | 0.00000E+00 | 0.00000E+00 | 0.00000E+00 | 0.00000E+00 | 0.00000E+00 |
| R3 | 2.22187E+00 | −3.81693E−18 | 5.35135E−21 | −4.06856E−24 | 8.74553E−28 | 1.78518E−31 |
| R4 | −7.24330E+01 | 2.49582E−20 | 1.32939E−21 | −1.69466E−24 | 4.60879E−28 | −6.93601E−32 |
| R5 | −7.11965E+01 | 8.22742E−19 | −1.75606E−21 | 1.70466E−24 | −6.34885E−28 | −6.20176E−32 |
| R6 | −3.36005E+00 | −2.39813E−18 | 2.69610E−21 | −1.65442E−24 | 4.22126E−28 | −2.20328E−32 |

| Conic coefficient | | Aspheric coefficient | | | |
| --- | --- | --- | --- | --- | --- |
| | k | A24 | A26 | A28 | A30 |
| R1 | 2.00363E+01 | −6.30273E−32 | −3.16300E−35 | 2.11280E−38 | 6.61831E−41 |
| R2 | 0.00000E+00 | 0.00000E+00 | 0.00000E+00 | 0.00000E+00 | 0.00000E+00 |
| R3 | 2.22187E+00 | 4.27116E−34 | −2.06549E−37 | −2.05761E−40 | 6.36226E−43 |
| R4 | −7.24330E+01 | 2.24923E−35 | −1.65443E−38 | 1.86199E−40 | 1.04378E−42 |
| R5 | −7.11965E+01 | −9.37740E−35 | 5.68353E−38 | 2.04409E−40 | 2.26888E−43 |
| R6 | −3.36005E+00 | 2.29331E−35 | −4.29050E−38 | −7.72670E−42 | 1.22267E−43 |

Figure 12:
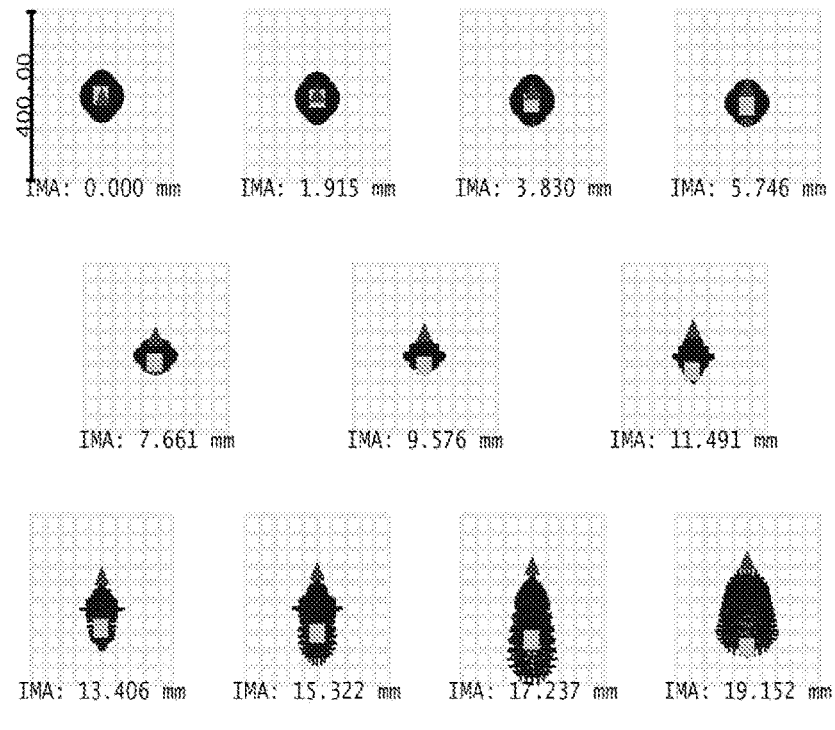
FIG. 12 is a spot diagram of the optical system shown in FIG. 11.
Figure 13:
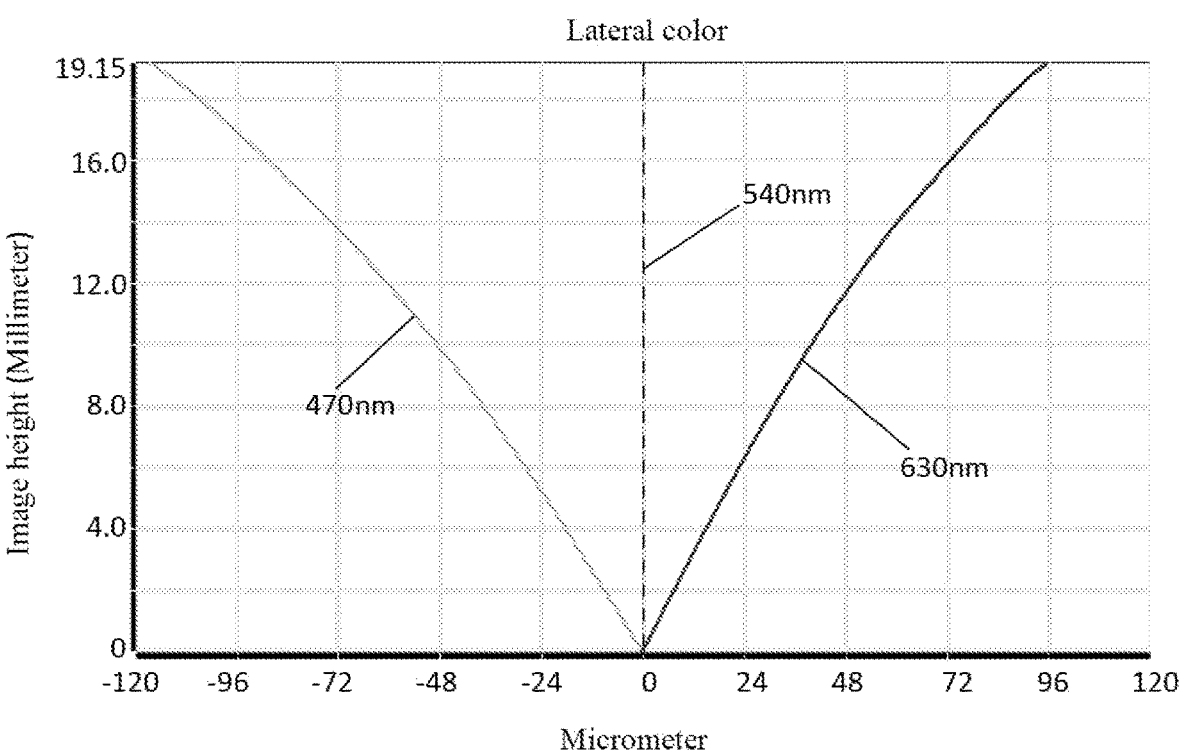
FIG. 13 is a schematic diagram of a lateral color of the optical system shown in FIG. 11.
Figure 14:
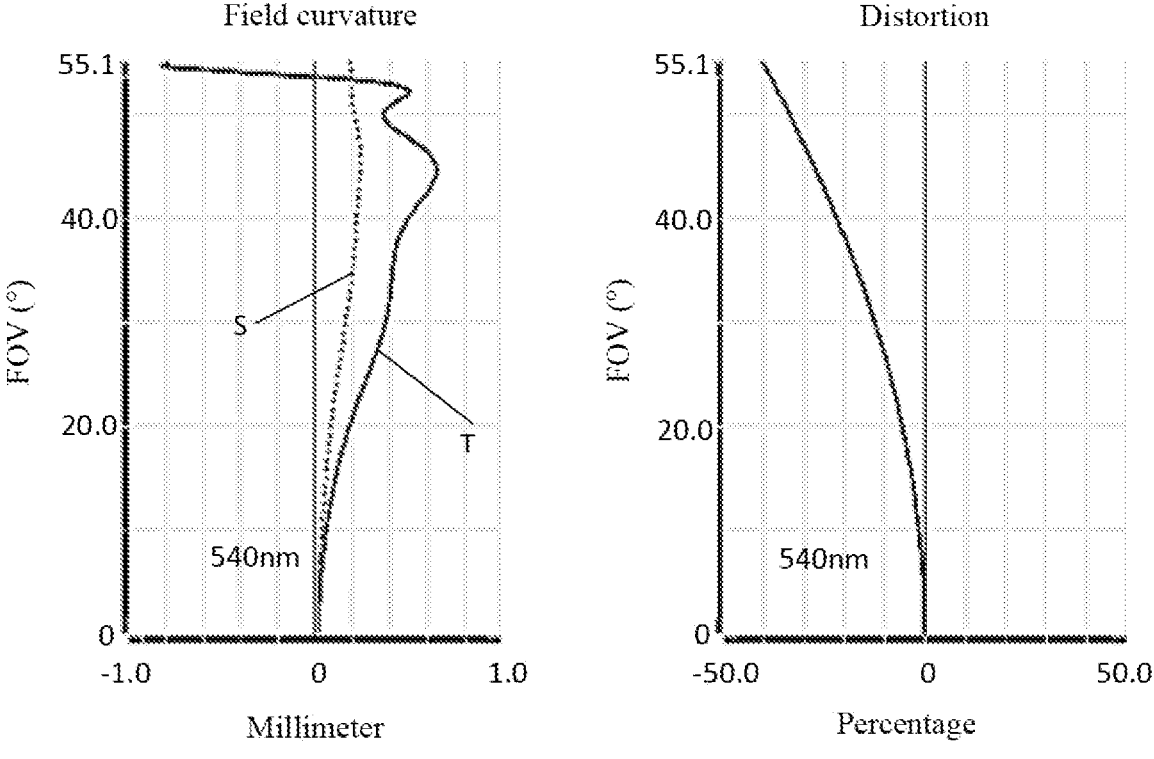
FIG. 14 is a schematic diagram of a field curvature and a distortion of the optical system as shown in FIG. 11.
Figure 15:
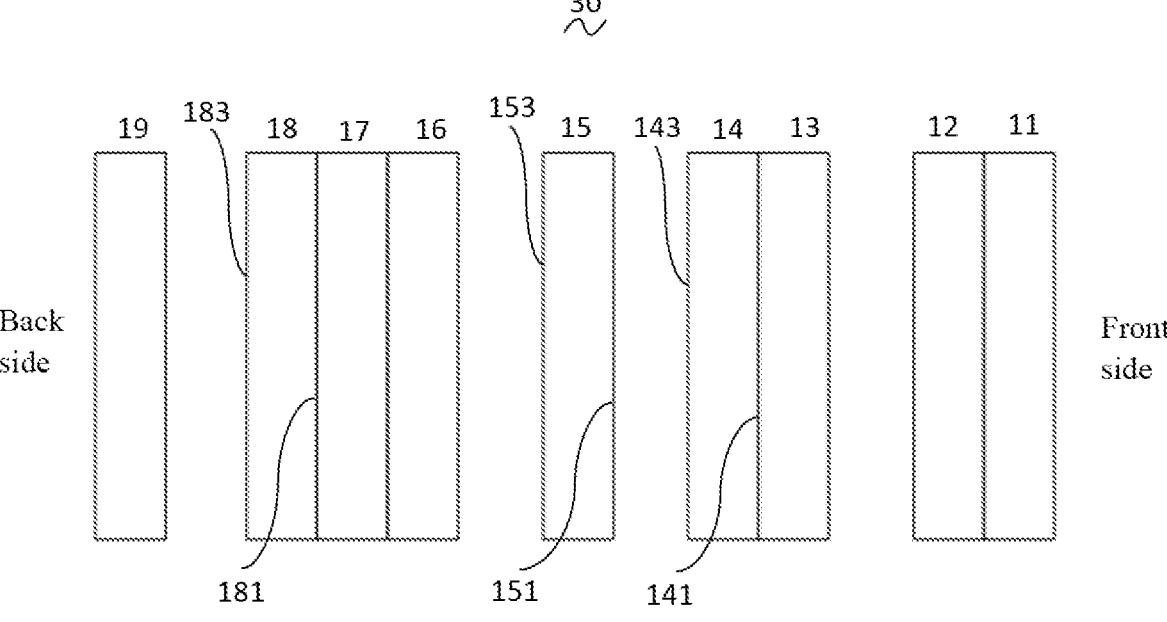
FIG. 15 is a schematic diagram of the optical system as shown in FIG. 11 including a film layer structure.

FIG. 12 and FIG. 13 are a spot diagram and a lateral color schematic diagram of the optical system 30 after light having a wavelength of 470 nm, 540 nm and 630 nm passes through the optical system 30 according to Embodiment 3, respectively. FIG. 14 is a schematic diagram of a field curvature and a distortion of the optical system 30 after light having a wavelength of 540 nm passes through the optical system 30 according to Embodiment 3. A field curvature S in FIG. 14 is a field curvature in a sagittal direction, and T is a field curvature in a meridian direction.

In this embodiment, the optical system 30 has an entrance pupil diameter ENPD of 10.000 mm, TTL of 18.409 mm, a focal length f of 22.636 mm, TTL/f of 0.813, a full-field image height IH of 19.152 mm, and a field of view FOV of 112.39° in a diagonal direction. The optical system 30 satisfies design requirements of small volume, and the maximum visible diameter greater than or equal to 10.00 mm, and has on-axis and off-axis chromatic aberrations fully corrected, thereby having excellent optical performance.

The above are only preferred embodiments of the present disclosure. Here, it should be noted that those skilled in the art may make modifications without departing from the inventive concept of the present disclosure, but these shall fall into the protection scope of the present disclosure.

What is claimed is:

1. An optical system, comprising from a front side to a back side:

an image plane provided with a circular polarizer attached to a back side of the image plane for transmitting light;

a third lens configured to move forward and backward along an optical axis of the optical system to change a diopter of the optical system, wherein a partial reflective element is provided on a front surface of the third lens;

a second lens;

a first lens comprising a composite film disposed at a front surface of the first lens, wherein the composite film comprises a polarization reflective film and a quarter wave plate, the polarization reflective film is attached to the front surface of the first lens, and the quarter wave plate is attached to a front side of the polarization reflective film; and an aperture located at the back side of the optical system, wherein the front surface of the first lens is a flat surface, a back surface of the first lens is a convex surface; a front surface of the second lens is a concave surface, a back surface of the second lens is a convex surface; the front surface of the third lens is a convex surface, and a back surface of the third lens is a convex surface;

wherein a maximum visible diameter of the optical system is VD, a maximum effective radius of each lens in the optical system is SDmax, and a following condition is satisfied:

$$VD \geq 10.00 \text{ mm, and } SDmax \leq 22.25 \text{ mm.}$$

2. The optical system as described in claim 1, wherein the back surface of the first lens is an aspheric surface.

3. The optical system as described in claim 1, wherein the front surface of the second lens, the back surface of the second lens, the front surface of the third lens and the back surface of the third lens are aspheric surfaces.

4. The optical system as described in claim 1, wherein a field of view FOV of the optical system satisfies 95.00°≤FOV≤115.00°.

5. The optical system as described in claim 1, wherein the optical system satisfies TTL≤18.60 mm, where TTL denotes a total optical length from the back surface of the first lens to an image plane of the optical system along the optical axis.

6. The optical system as described in claim 1, wherein the partial reflective element is a semi-transparent and semi-reflective film, and has a transmittance of 50% and a reflectivity of 50%.

7. The optical system as described in claim 1, wherein the polarization reflective film has a reflectivity greater than or equal to 95%.

8. The optical system as described in claim 1, wherein an optical distortion of the optical system is defined as DIST, which satisfies DIST≤30.25% in a state of 0D diopter.

9. The optical system as described in claim 1, wherein a lateral color of the optical system is smaller than or equal to 185.00 μm.

10. The optical system as described in claim 1, wherein a total optical length from the back surface of the first lens to an image plane of the optical system along the optical axis is defined as TTL, and a focal length of the optical system is defined as F, a following condition is satisfied: TTL/F≤0.85.

11. The optical system as described in claim 1, wherein the image plane is a display device with a size-diagonal length of 2.1 inch.

12. An optical system comprising from a front side to a back side:

an image plane provided with a circular polarizer attached to a back side of the image plane for transmitting light;

a third lens configured to move forward and backward along an optical axis of the optical system to change a diopter of the optical system, wherein a partial reflective element is provided on a front surface of the third lens;

a second lens, a first lens comprising a composite film disposed at a front surface of the first lens, wherein the composite film comprises a polarization reflective film and a quarter wave plate, the polarization reflective film is attached to the front surface of the first lens, and the quarter wave plate is attached to a front side of the polarization reflective film; and an aperture located at the back side of the optical system, wherein the front surface of the first lens is a flat surface, a back surface of the first lens is a convex surface; a front surface of the second lens is a concave surface, a back surface of the second lens is a convex surface; the front surface of the third lens is a convex surface, and a back surface of the third lens is a convex surface;

wherein a maximum visible diameter of the optical system is VD, a maximum effective radius of each lens in the optical system is SDmax, a field of view of the optical system is FOV, and a following condition is satisfied:

$$VD \geqslant 10.00 \text{ mm}, SD\text{max} \leqslant 22.25 \text{ mm, and } 112.39° \leqslant FOV \leqslant 115.00°.$$

13. The optical system as described in claim 12, wherein the back surface of the first lens is an aspheric surface.

14. The optical system as described in claim 12, wherein the front surface of the second lens, the back surface of the second lens, the front surface of the third lens and the back surface of the third lens are aspheric surfaces.

15. The optical system as described in claim 12, wherein the optical system satisfies TTLS 18.60 mm, where TTL denotes a total optical length from the back surface of the first lens to an image plane of the optical system along the optical axis.

16. The optical system as described in claim 12, wherein the partial reflective element is a semi-transparent and semi-reflective film, and has a transmittance of 50% and a reflectivity of 50%.

17. The optical system as described in claim 12, wherein t e polarization reflective film has a reflectivity greater than or equal to 95%.

18. The optical system as described in claim 12, wherein an optical distortion of the optical system is defined as DIST, which satisfies DIST≤30.25% in a state of 0D diopter.

19. The optical system as described in claim 12, wherein a lateral color of the optical system is smaller than or equal to 185.00 μm.

20. The optical system as described in claim 12, wherein a total optical length from the back surface of the first lens to an image plane of the optical system along the optical axis is defined as TTL, and a focal length of the optical system is defined as F, a following condition is satisfied: TTL/F≤0.85.

* * * * *